July 15, 1969     V. J. TRUNCALI     3,455,474
SELF-LOADING BIN TRAILER
Filed Nov. 13, 1967     2 Sheets-Sheet 1
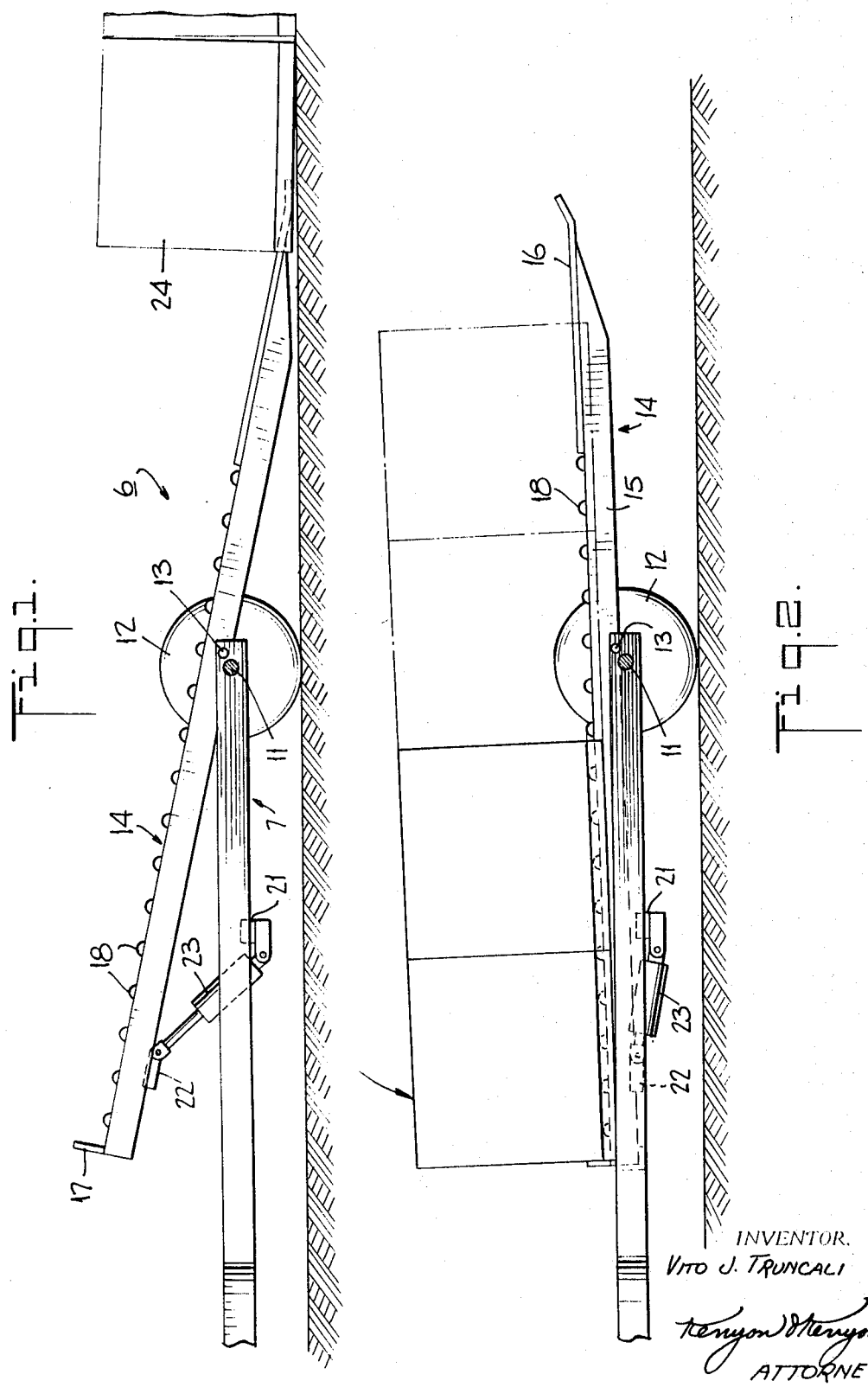
INVENTOR.
VITO J. TRUNCALI
Kenyon & Kenyon
ATTORNEYS

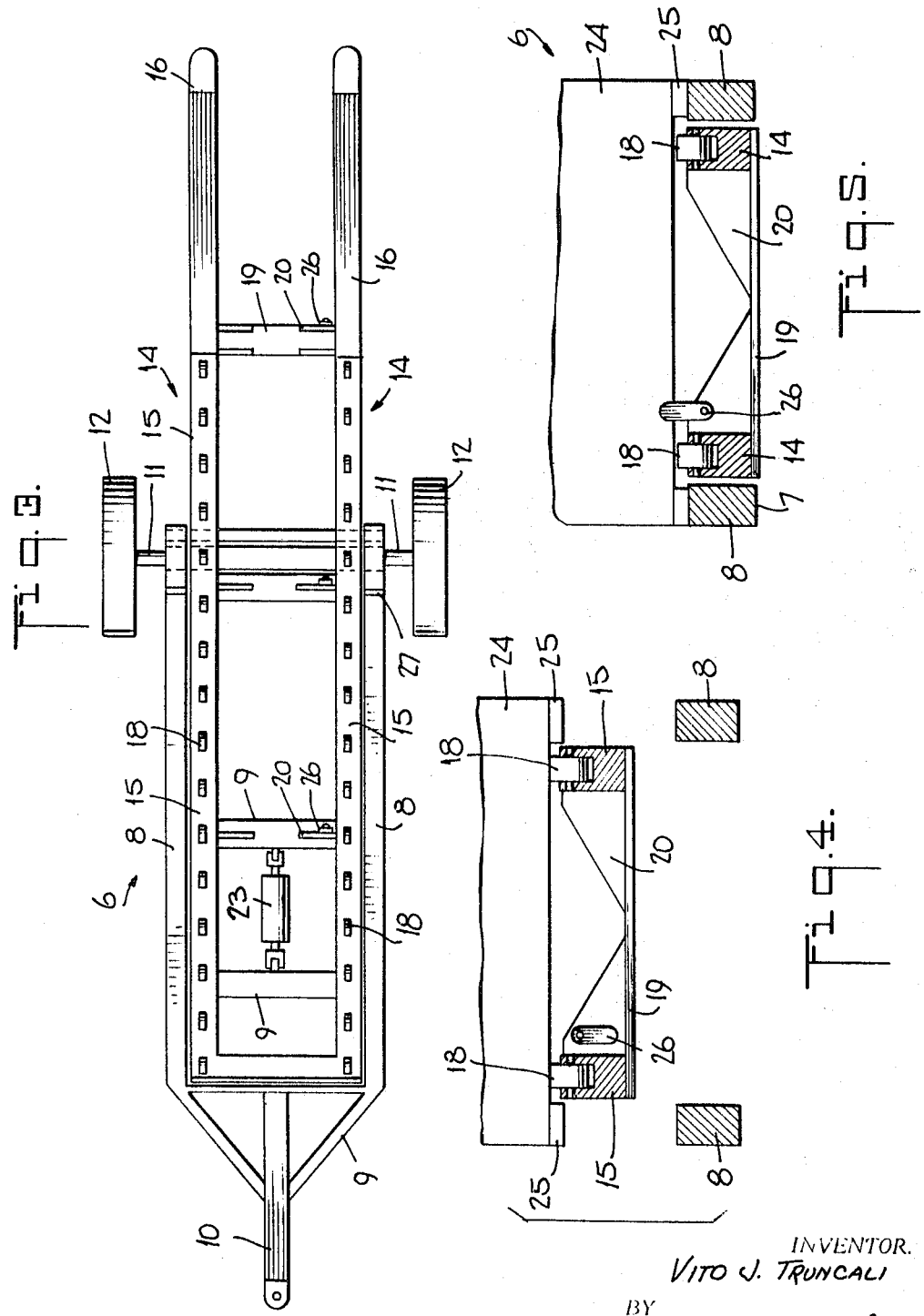

United States Patent Office 3,455,474
Patented July 15, 1969

3,455,474
SELF-LOADING BIN TRAILER
Vito J. Truncali, Bingham Road,
Marlboro, N.Y. 12542
Filed Nov. 13, 1967, Ser. No. 682,066
Int. Cl. B60p 1/16
U.S. Cl. 214—505                    8 Claims

ABSTRACT OF THE DISCLOSURE

The trailer has an outer support frame and a pivotally mounted inner frame inside the outer frame. The rollers on the inner frame allow the bins to roll along the inner frame depending upon the direction of tilt of the inner frame. The forked end permits loading of the bins onto the rollers while the locking lugs permit locking of the loaded bins in position on the inner frame. When in a rest position, the outer frame supports the bins.

---

This invention relates to a self-loading bin trailer. More particularly, this invention relates to a self-loading bin trailer for loading of bulk bins of fruit and vegetables.

In harvesting fruit and vegetables, bulk bins have in very recent years been used in the field for the collection of quantities of the fruit and vegetables, for example, the bulk bins usually used have had capacities of about fifteen to twenty bushels of produce. In order to transport these bulk bins from one place to another while empty or full, various types of tractor driven trailers have heretofore been used. These trailers have generally been constructed with a platform which either tilts about an axle of the transport wheels of the trailer or in some instances, while tilting, moves vertically downwardly or upwardly relative to the ground depending on whether a bin is being loaded or unloaded.

Another method for transporting bulk bins has been to position a fork or platform on the front or back end of a tractor. A loaded bin is positioned upon the fork or platform and transported in that fashion. Aside from the fact that this approach is limited to the transporting of one or two bins at most, the tractor has a tendency to be unstable due to the excessive weight (approximately 1,000 pounds per bin) positioned away from its center of gravity. In addition, the transportation of produce in this fashion has a distinct tendency to bruise the fruit or vegetables due to the instability of the load. In the case of fruit, particularly, this tendency to bruise the product can result in substantial damage to the crop resulting in a reduced market price.

In addition, the heretofore trailers have in some instances required some degree of manual labor in loading or unloading a bulk bin. At the very least, they have required the tractor operator to continuously mount and dismount from his tractor during the loading and unloading operation. In other instances, these trailers have required complex components to enable a platform to be manipulated in various planes of motion.

Further, the platforms which have been utilized to load the bulk bins have frequently been used to carry the weight of the bulk bins and contained produce during travel from one pickup point to another. Thus, in some instances, such platforms have been subjected to various detrimental loading froces and strains during travel such that the useful life of the trailers can be adversely shortened.

The present invention permits the use of a self-contained loading and transporting means in one unit. It permits loading, unloading and transporting of bulk bins with one piece of equipment and one operator.

Accordingly, it is an object of the invention to provide a bin loading and unloading trailer which is substantially automatic in operation.

It is another object of the invention to provide a bin trailer that can be loaded and unloaded without the tractor driver dismounting from his tractor.

It is another object of the invention to use a pivotal frame for loading bulk bins onto a stationary load-carrying frame.

It is another object of the invention to provide a bin-loading trailer of relatively long life.

It is another object of the invention to provide a bin-loading trailer which is simple to use and operate.

It is another object of the invention to rapidly load and unload produce-containing bins on a trailer.

Briefly, the invention provide sa trailer which is adapted to be driven in tandem by a tractor. The trailer includes an outer frame which contains one or more pairs of support wheels for permitting travel of the trailer and an inner frame which is pivotally mounted within the outer frame. The outer frame has a substantially horizontal bin receiving surface which is formed by a pair of parallel rails. The inner frame has a pair of parallel rails which define a curved fork at one end for slipping under the bulk bins to be loaded and which contains rollers behind the fork for conveying the loaded bins from one end of the inner frame to the other.

The inner frame is pivoted relative to the outer frame by means of, for example, a double-action hydraulic cylinder mounted on the outer frame and connected to the inner frame at a point spaced from the pivot point. In addition, the inner frame is pivoted from a rest position (wherein the rollers of the inner frame are out of contact with bins resting on the rails of the outer frame) to a tilt position wherein the curved fork slides on the ground below the plane of the bottom of a bulk bin.

In use, the trailer is brought to a bin-pickup point where a number of bins have been racked in a line, one behind the other. The bins with runners positioned on the underside of the bin are aligned so that the runners are parallel to the forks of the trailer. The trailer is then backed by means of the tractor towards the aligned bins and the inner frame pivoted to the tilt position so as to position the forks under the first bin and between the runners. The trailer is then moved continuously in a backward direction forcing the first bin to ride up onto the forks and ultimately onto the roller frame. The tractor operator continues to move the trailer in a backward direction until each of the bins, in turn, is forced up over the forks and moved into position on the roller frame. When each of the bins has been moved up onto the forks and ultimately positioned on the roller frame, the inner frame is pivoted to the rest position. The rails of the inner frame at that point are inclined towards the front of the trailer so that the first-loaded bins rest on the rails of the outer frame at the forward end of the trailer. In practice, four or five bins are loaded at one time although individual or single bins can be loaded in essentially the same manner.

The loaded trailer is then transported to an area for unloading, for example, a processing plant or a refrigerated warehouse. In order to unload the bins from the trailer, the inner frame is pivoted from the rest position to the tilt position by means of the double action hydraulic cylinder. When the last bin reaches the ground or floor, the load is then released allowing the bins to settle to the ground as the trailer is moved forward. In actual practice, the tractor operator actuates the hydraulic cylinder so as to pivot the inner frame to the tilt position and moves the tractor and trailer in a forward direction so as to move the trailer out from underneath the bins being unloaded. This is necessary since the weight of the bins is such that as they move off the forked end of the trailer, the bins upon striking the surface of the ground or floor become almost immobile. The tractor operator, with a minimum of experience, learns to coordinate the unloading operation properly so as to drop the bins off the end of the trailer while at the same time moving the trailer out from underneath the bins.

When the trailer is loaded, the bins are positioned against each other so as to provide stability to the load. In addition, the first-loaded bin slides along the roller frame and ultimately is positioned against the butt end of the inner frame. Further, a locking lug or flange in the form of a raised metal projection is positioned on the outer frame in the center of the trailer on the portion of the outer frame away from the forked end. In transporting the loaded trailer in an uphill direction, the locking flange assists in holding the loaded bins on the trailer. The first-loaded bins are held stationary by resting on the outer frame since the inner frame is pivoted below the outer frame. The locking flange further assists in holding the bins in place. Additional locking means are provided to be used if necessary, but in practice, this arrangement has not proved necessary. The curved forks serve to hold the additional loaded bins in position on the trailer. When unloading, the inner frame is pivoted above the outer frame and the locking flanges so as to permit movement of the loaded bins along the rollers of the inner frame.

It is apparent from the foregoing description that the time sequence for loading and unloading is minimal. As an approximation, four or five loaded bins each weighing 1,000 pounds may be loaded or unloaded within a 30-second interval. Contrasting this operation with present methods for handling loaded produce bins, it is apparent that economy of operation is maximized.

These and other objects and advantages will become more apparent from the following detailed description taken in conjunction with the following drawings in which:

FIG. 1 illustrates a side elevational view of the trailer in a tilt position with the forked end positioned under a bin;

FIG. 2 illustrates a view of the trailer similar to FIG. 1, with the trailer in the rest position subsequent to loading of a plurality of bins;

FIG. 3 illustrates a top plan view of the unloaded trailer in the rest position;

FIG. 4 illustrates a cross-sectional view of the trailer with a bin in the work position; and FIG. 5 illustrates a cross-sectional view of the trailer with a bin in the rest position.

Referring to FIGS. 1, 2 and 3, the trailer 6 has an outer frame 7 consisting of a pair of parallel rails 8 which are joined at one end and spaced apart by cross-beams 9 and a draw bar 10 connected to the rails 8 together for hooking up to a tractor (not shown). In addition, the outer frame 7 has a pair of stub axles 11 on the rails 8 to each of which is fastened a rotatable support wheel 12 for permitting transportation of the trailer. A pivot shaft 13 is positioned through the outer frame 7 adjacent to the stub axles 11 upon which an inner frame 14 is pivotally mounted for pivoted movement with respect to the outer frame 7. The inner frame 14 consists of a pair of parallel rails 15, each of which has a curved end 16 and at the opposite end a flange or butt 17 designed to act as a bin-stop when the trailer is being loaded. The curved ends 16 of the rails 15 serve to define a forked end for the inner frame 14. The tips of the forks bend upward at an angle so as to permit the tip to be positioned under the loaded bin without cutting into the underside of the bin and to avoid digging into the ground below the bin. An angle of about 15° to 25° has been found to be suitable. In addition, the upper side of the curved portion of the fork is tapered in a downward direction so as to facilitate sliding of the bins up onto the forks.

Positioned within the inner frame 14 in the two parallel rails is a series of rollers 18 running substantially the length of the inner frame 14 until reaching the forked end at the loading end of the trailer. The rails 15 of the inner frame 14 are secured together by cross-beams 19 and further braced by means of support flanges 20. Attached to a cross-beam 9 of the outer frame 7 by means of a bracket 21 and in turn fastened to the inner frame 14 by means of a bracket 22 is a double-action hydraulic ram 23 which provides for the raising and lowering of the inner frame 14 in relation to the outer frame 7. The rollers 18 are positioned slightly above the plane of the forks 16 so as to permit the bins 24 to slide up onto the roller frame 14' when loading and down from the roller frame onto the forks when unloading.

Referring to FIGS. 1 and 4, the trailer 6 is adapted to load bins 24 which are constructed, for example, of a known box shape with a base having a pair of longitudinally extending runners 25 along the edges to raise the base above ground level. In addition, other runners can be secured to the bins 24, for example, at a central point provided such runners do not interfere with the loading and unloading of the bins on the trailer. In practice, a number of bins are encountered that have three runners equally spaced along the bottom of the bin. The support braces for the trailer frame are formed, for example, in a V-shaped fashion so as to permit sliding of the third runner above and between the ends of the support braces.

Referring to FIGS. 3, 4 and 5, locking lugs 26 are pivotally mounted on at least one of the support flanges of the cross-beams 19 of the inner frame 14 so as to be moved into position above the plane of the inner frame 14 if necessary, to hold the loaded bins 24 in position on the trailer. In addition, stationary locking flanges 27 can be positioned towards the center of the trailer.

Referring to FIG. 4 in the tilt position of the trailer 6, the produce bin 24 rests upon the rollers 18 of the inner frame 14 with the locking lugs 26 in an unlocking position. In this position the rails 15 are positioned inside the runners 25 of the bin 24.

Referring to FIG. 5, in the rest position of the trailer 6, the forwardmost bins 24 rest on the rails 8 of the outer frame 7 and the locking lugs 26 prevent rolling of the bins 24 towards the forked end of the inner frame 14. In this position, the bins are stable since the inner frame 14 is pivoted below the outer frame 7 so that the rollers 18 are out of contact with the bins 24 and the bins are resting on the outer frame. The first loaded bins are held in position by the bin-stop 17 and the locking flange 27.

Operation

In operation, the trailer 6 by means of a tractor is positioned adjacent to a plurality of produce bins 24. The inner frame 14 is pivoted relative to the outer frame 7 by means of the hydraulic ram 23 which raises the bin-stop 17 of the inner frame 14 and subsequently lowers the forked end 16 of the inner frame 14 about the pivot shaft 13 positioned in the approximate center of the inner frame 14. When the forked end 16 is lowered adjacent to the first produce bin 24, the tractor is backed towards the bins 24 forcing the forked end 16 under the produce bins 24 (FIG. 1) until the trailer is driven under the row of bins. The trailer is backed continually until the forked end is moved under each bin, forcing said bins up over the forked end 16 and onto the roller frame. The weight of the last bin on the curved end holds the load in place. The hydraulic ram 23 is actuated to lower the butt end 17 of the inner frame 14 (FIG. 2). At that point, the locking lugs 26 can be positioned in a locking position so as to hold the loaded bins 24 in position. It is to be noted that the forwardmost loaded bins 24 are positioned with the runners 25 resting on the rails of the outer frame 7 with the bin above and out of contact with the rollers 18 and inner frame 14 (FIG. 5). The loaded bins are also held in position by the assistance of the locking flange 27 against which the bins abut.

If desired, a partial loading may be accomplished with transportation of the loaded bins 24 locked in position or in some instances an individual bin 24 may be transported while resting on the forked end 16 of the inner frame 14 alone.

In order to unload the loaded bins 24, the inner frame 14 of the trailer is pivoted by the hydraulic ram 23 so as to lower the forked end 16. This allows the loaded bins 24 to roll down the inner frame 14 on the rollers 18 as the trailer is driven forward and ultimately off the forked end 16 of the trailer. While the bins 24 can be unloaded in this manner onto a ground surface, a suitable conveyor can also be provided to cooperate with the rails 8 of the inner frame 14 to accept the unloaded bins 24 in a continuous manner.

Various modifications will be readily apparent to those skilled in the art after a consideration of the foregoing specification, abstract of the invention and attached drawings, and accordingly, it is not desired to limit the invention to the exact construction shown and described.

What is claimed is:

1. A trailer for loading bins comprising an outer frame having a pair of spaced parallel rails, an inner frame within said rails, means for pivoting said inner frame with respect to said rails of said outer frame, a series of rollers mounted within said inner frame for movement of a bin along said inner frame, locking flanges positioned on said outer frame for locking the loaded bins in position, said inner frame capable of being pivoted below the plane of said outer frame so as to permit the loaded bins to rest on said outer frame subsequent to loading.

2. A trailer as recited in claim 1, in which said means for pivoting said one frame comprises a pivot pin mounted in said outer frame for pivoting of said inner frame relative to said outer frame, a hydraulic mechanism mounted between said inner frame and said outer frame for pivoting the inner frame relative to the outer frame.

3. A trailer as recited in claim 1, further comprising means for moving the trailer from one location to another.

4. A trailer as recited in claim 3, in which said means for moving the trailer comprises a pair of stub axles mounted on said outer frame, a pair of wheels rotatably mounted on said stub axles, and a draw bar secured to one end of said outer frame opposite said forked end.

5. A trailer as recited in claim 1, in which locking lugs are positioned on said inner frame for locking the loaded bins in position.

6. A trailer as recited in claim 1, wherein said inner frame possesses a forked end comprising a pair of curved forks.

7. A trailer as recited in claim 6, wherein said forked ends are curved upward at an angle of approximately 15 to 25°.

8. A trailer as recited in claim 6, wherein said rollers mounted within said inner frame are positioned above the horizontal plane of the forked end.

References Cited

UNITED STATES PATENTS

| | | | |
|---|---|---|---|
| 1,536,611 | 5/1925 | Duke | 214—505 |
| 1,870,573 | 8/1932 | Kuchar | 214—505 |
| 2,408,862 | 10/1946 | Lisota | 214—506 |
| 2,452,681 | 11/1948 | Rehberger | 214—505 |
| 2,828,036 | 3/1958 | White | 214—505 |
| 3,335,887 | 8/1967 | Snook | 214—84 XR |

ALBERT J. MAKAY, Primary Examiner

U.S. Cl. X.R.

214—84